United States Patent
Hwa et al.

(10) Patent No.: US 10,287,168 B1
(45) Date of Patent: May 14, 2019

(54) METHOD OF MANUFACTURING GRAPHENE MATERIAL

(71) Applicant: NATIONAL TAIPEI UNIVERSITY OF TECHNOLOGY, Taipei (TW)

(72) Inventors: Kuo Yuan Hwa, Taipei (TW); Syang Peng Rwei, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 0 days.

(21) Appl. No.: 15/960,305

(22) Filed: Apr. 23, 2018

(51) Int. Cl.
*C01B 32/198* (2017.01)

(52) U.S. Cl.
CPC .................. *C01B 32/198* (2017.08)

(58) Field of Classification Search
CPC .................................... C01B 32/198
See application file for complete search history.

(56) References Cited

U.S. PATENT DOCUMENTS

2015/0284253 A1* 10/2015 Zhamu ............... C09K 5/14
423/448

FOREIGN PATENT DOCUMENTS

CN 104891482 * 9/2015
CN 104998266 * 10/2015

OTHER PUBLICATIONS

CN104891482 translated 7 pages (Year: 2015).*
CN104998266 translated 7 pages (Year: 2015).*

* cited by examiner

*Primary Examiner* — Yevgeny Valenrod
*Assistant Examiner* — Blaine G Doletski
(74) *Attorney, Agent, or Firm* — Muncy, Geissler, Olds & Lowe, P.C.

(57) ABSTRACT

Disclosed is a method of manufacturing graphene material, including steps of first oxidation, first heating, second heating, second oxidation, separation, drying, first ultrasonic vibration, reduction, second ultrasonic vibration, heating, and filtration. The first oxidation and the second oxidation respectively employ the first oxidant and the second oxidant with different strength of oxidation to appropriately control the range of the ratio of carbon vs. oxygen content in the graphene oxide. Therefore, the resultant graphene material through the reduction process has resistivity within 1.45~150 Ω/cm.

9 Claims, 2 Drawing Sheets

METHOD OF MANUFACTURING GRAPHENE MATERIAL

BACKGROUND OF THE INVENTION

1. Field of the Invention

The present invention generally relates to a method of manufacturing graphene material, and more specifically to a method of manufacturing graphene material employing two steps of oxidation with two oxidants having different strength of oxidation to precisely control oxygen content of the oxidized graphene within a preferred range, and then performing reduction process to appropriately decrease oxygen content and resistivity to form reduced graphene material.

2. The Prior Arts

As great progress in technology for electronic industry, electronic consumer products have built in more complex electrical functions. Because the customers general prefer a lighter, thinner, shorter and smaller electronic device, the electronic elements and connection wires need to further shrink. This causes a problem that resistance and consuming power greatly increase, and even signal property is badly affected. Thus, it is greatly needed to develop a high quality conductive material.

Graphene has a sheet-like graphic structure with excellent chemical resistance and thermal endurance, especially, the thinnest and hardest material. Further, graphene has thermal conductivity higher than carbon nanotube and artificial diamond, electron mobility higher than carbon nanotube and silicon lattice, and electrical resistivity lower than copper and silver. Thus, related manufacturers have focused on developing high performance conductive coating material, flexible electrical material, and battery material.

Owing to the importance of low resistivity for the connection wires between the electronic elements, many advanced processes have been developed like modifying surface property of graphene.

In the prior arts, one method of manufacturing a complex material containing graphene with specific functional groups and rubber substantially comprises oxidizing graphic to obtain oxidized graphic or swollen and separate graphic layers, and then decomposing the oxidized graphic or graphic layers to release the gas by a fast heating process, thereby forming the functionalized graphene having high content of oxygen-containing groups.

However, one shortcoming in the prior arts is that the content of the oxygen-containing functional groups in the graphene oxide has a broad distribution like 5-40%, and as a result, it is difficult to further precisely control resistivity of the resultant graphene material after subsequent processes.

Therefore, it is greatly needed to provide a new method of manufacturing graphene material employing two steps of oxidation with two oxidants having different strength of oxidation to precisely control oxygen content of the oxidized graphene within a preferred range, and then performing reduction process to appropriately decrease oxygen content and resistivity to form reduced graphene material, thereby overcoming the above problems in the prior arts.

SUMMARY OF THE INVENTION

The primary object of the present invention is to provide a method of manufacturing graphene material, comprising the sequential steps of first oxidation, first heating, second heating, second oxidation, separation, drying, first ultrasonic vibration, reduction, second ultrasonic vibration, heating, and filtration for manufacturing graphene material with low resistivity within a range of 1.45~150 Ω/cm.

Specifically, the first oxidation step is performed by adding 10-40% (weight percent) sulfuric acid, sodium nitrate, and graphene to a reaction container in an ice bath, stirring for a period of a first stirring time, adding potassium manganate a first oxidant, and then stirring for a period of a second stirring time, wherein a weight ratio of graphene, sulfuric acid, and sodium nitrate is 1:1.5-0.5:1-6, and a ratio of volume of sulfuric acid to weight of graphene being 15-60 ml:1 g.

The first heating step comprises sealing the reaction container, heating up to a first heating temperature, and stirring for a period of a third stirring time, and the second heating step comprises adding de-ionized water, sealing the reaction container, heating up to a second heating temperature, stirring for a period of a fourth stirring time, and forming a preliminary graphene oxide.

The second oxidation step comprises adding de-ionized water to the preliminary graphene oxide, stirring for a period of a fifth stirring time, adding hydrogen peroxide solution as a second oxidant, and stirring for a period of a sixth stirring time, wherein a ratio of volume of hydrogen peroxide solution to weight of graphene is 1-20 ml:1 g.

The separation step comprises adding de-ionized water and hydrogen chloride solution, and removing a supernatant by a centrifugal machine to obtain a precipitant, wherein the supernatant having pH within 7±1. The drying step comprises adding alcohol solution to the precipitant, and a heated-drying or freeze-drying process at a drying temperature from −20° C. to 80° C. for 4 hours-2 days to obtain a graphene oxide, wherein a ratio of carbon to oxygen content in the graphene oxide is 1.14-2.81.

The first ultrasonic vibration step is performed by adding de-ionized water to the graphene oxide, and carrying out ultrasonic vibration through an ultrasonic vibration machine.

The reduction comprises adding a reductant, and gradually adding 25% (weight percent) ammonia solution to keep pH with 9-10, wherein a weight ratio of the reductant to the graphene oxide being 0.5-5.0:0.5.

The second ultrasonic vibration comprises adding de-ionized water, and performing another ultrasonic vibration through the same ultrasonic vibration machine or another one ultrasonic vibration machine. The heating step comprises heating up to a third heating temperature, and stirring for a period of a seventh stirring time. Finally, the filtration step performs a suction-filtration process to remove remaining liquid and obtain a reduced graphene material.

The method of the present invention employs two steps of oxidation to precisely control oxygen content of the oxidized graphene within a preferred range, and particularly, two oxidants with different strength of oxidation are used, such that the reduced graphene material after the reduction step has low resistivity within a preferred range.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
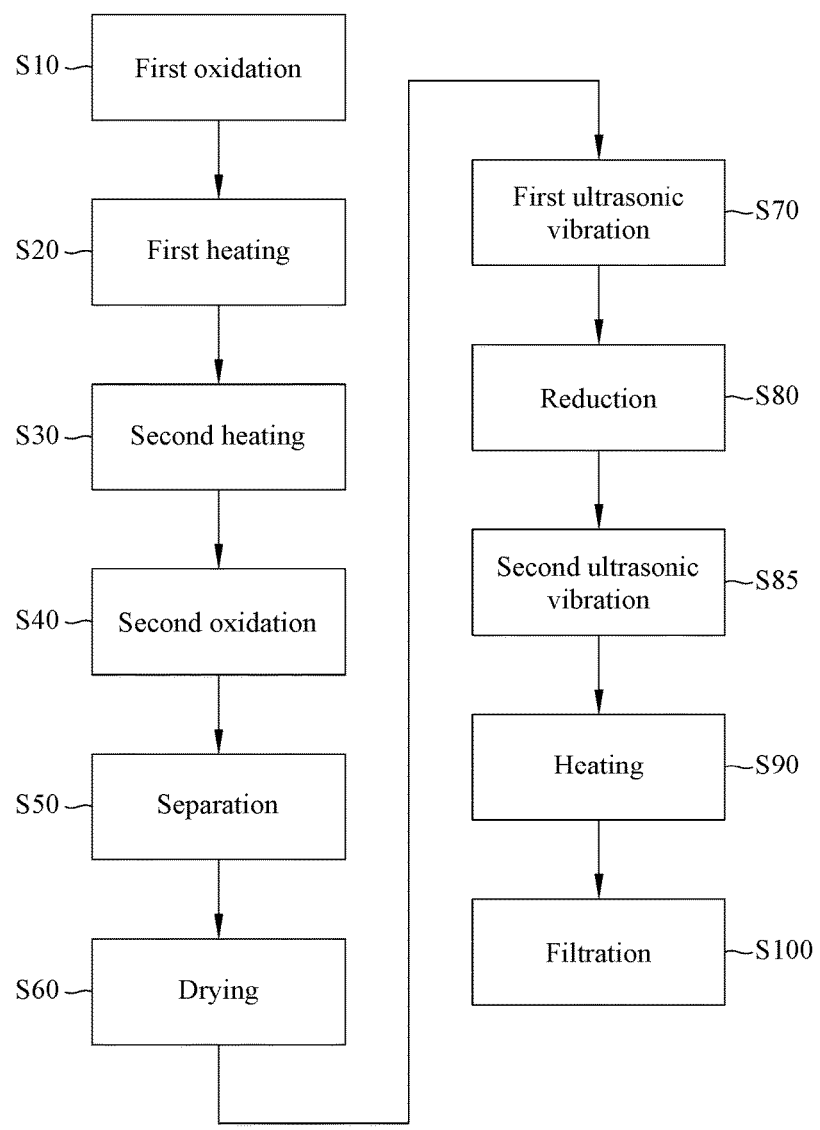
FIG. 1 is a view showing the method of manufacturing graphene material according to the embodiment of the present invention.

Please refer to FIG. 1 illustrating the method of manufacturing graphene material according to the embodiment of the present invention. As shown in FIG. 1, the method of manufacturing graphene material comprises the sequential steps of first oxidation S10, first heating S20, second heating S30, second oxidation S40, separation S50, drying S60, first ultrasonic vibration S70, reduction S80, second ultrasonic vibration S85, heating S90, and filtration S100 for manufacturing graphene material with low resistivity.

Specifically, the method of the present invention starts at the step of first oxidation S10, in which 10-40% (weight percent) sulfuric acid, sodium nitrate, and graphene are added to a reaction container in an ice bath, and then the solution is stirred for a period of a first stirring time. The weight ratio of graphene, sulfuric acid, and sodium nitrate is 1:1.5-0.5:1-6, and the ratio of volume of sulfuric acid to weight of graphene being 15-60 ml:1 g. In particular, the first oxidation step S10 is performed at a temperature not higher than 20° C., the first stirring time is 1-5 hours, and the second stirring time is 10 minutes to 3 hours.

Next, in the first heating step S20, the reaction container is sealed, then heated up to a first heating temperature, and stirred for a period of a third stirring time. The first heating temperature is 30-40° C., and the third stirring time is 10 minutes-1 hour.

The second heating step S30 is performed by adding de-ionized water, sealing the reaction container, heating up to a second heating temperature, stirring for a period of a fourth stirring time, and forming a preliminary graphene oxide. More specifically, a ratio of volume of the ionized water added in the step S30 to weight of the graphic added in the step S10 is 30-98 ml:1 g, the second heating temperature is 80-99° C., and the fourth stirring time is 10 minutes-1 hour.

In the second oxidation step S40, de-ionized water is added to the preliminary graphene oxide, the solution is stirred for a period of a fifth stirring time, hydrogen peroxide solution is then added as a second oxidant, and the solution is stirred for a period of a sixth stirring time. Specifically, a ratio of volume of hydrogen peroxide solution to weight of graphene being 1-20 ml:1 g. Furthermore, a ratio of volume of the ionized water added in the step S40 to weight of the graphene added in the step S10 is 65-350 ml:1 g, the fifth stirring time is 30 minutes-2 hour, and the sixth stirring time is 1-3 hours.

The separation step S50 is then performed by adding de-ionized water and hydrogen chloride solution, and removing a supernatant by a centrifugal machine to obtain a precipitant. The supernatant has pH within 7±1. In the drying step S60, alcohol solution is added to the precipitant, and drying is performed at a heating temperature for 4 hours~2 days to obtain a graphene oxide. The drying temperature is –20-80° C., a concentration of the alcohol solution is 10-70% (weight percent).

In particular, the graphene oxide comprises oxygen-containing functional groups such as —O, —O—, —OH, and —COOH, and a ratio of carbon to oxygen content in the graphene oxide is 1.14-2.81.

In the first ultrasonic vibration step S70, de-ionized water is added to the graphene oxide, and ultrasonic vibration is performed through an ultrasonic vibration machine. Specifically, a ratio of volume of the ionized water added in the step S70 to weight of the graphene oxide the step S40 is 500-1500 ml:0.5 g, and the step S70 lasts for 30 minutes-2 hours.

The reduction step S80 is performed by adding a reductant, and gradually adding 25% (weight percent) ammonia solution to keep pH within 9-10. Specifically, the reductant is vitamin C or so called ascorbic acid, and a weight ratio of the reductant to the graphene oxide being 0.5-5.0:0.5.

Next, in the second ultrasonic vibration step S85, de-ionized water is added, and another ultrasonic vibration is performed through the same ultrasonic vibration machine in the step S70 or another one ultrasonic vibration machine. The step S85 preferably lasts for 10-40 minutes.

The heating step S90 is performed by heating up to a third heating temperature, and stirring for a period of a seventh stirring time. The third heating temperature is 80-98° C., and the seventh stirring time is 1-3 hours.

Finally, in the filtration step S100, a suction-filtration process is performed via a suction-filtration machine and then a drying process is performed to obtain the reduced graphene material. More specifically, the reduce graphene material has resistivity within a range of 1.45-150 Ω/cm.

Figure 2:
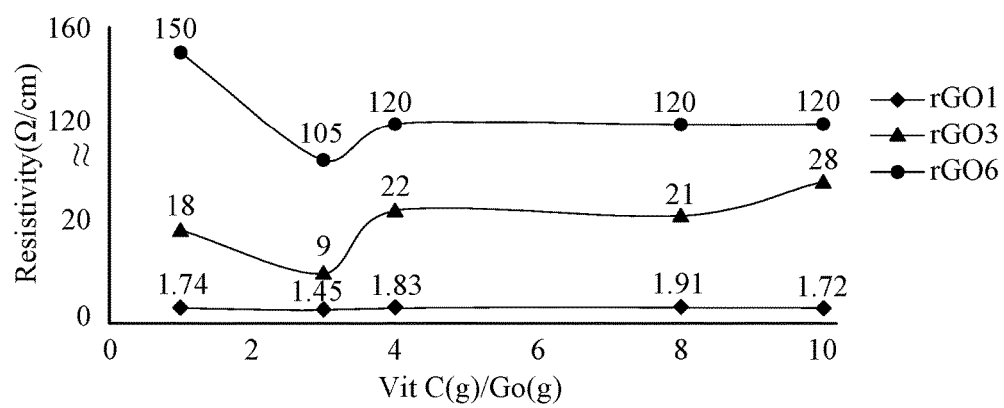
FIG. 2 is a diagram showing resistivity of the reduced graphene material manufactured by the method according to the present invention.

Further refer to FIG. 2 illustrating resistivity one illustrative example of the reduced graphene material manufactured by the method according to the present invention. Three curves in FIG. 2 specified by rGO1, rGO3, and rGO6 indicate resistivity of three samples of the reduced graphene material with 1 g of graphene added by 1, 3, and 6 g of $KMnO_4$, respectively. It is obvious that resistivity of the reduced graphene material varies as different reductant weight is added with respect to the same weight of graphene oxide. As shown in FIG. 2, after 1, 3, 4, 8, and 10 g of the reductant like ascorbic acid is respectively added to 1 g of graphene oxide, the final reduced graphene material has resistivity within 1.45~150 Ω/cm, and resistivity approaches to a range of 1.72~120 Ω/cm as the reductant dose increases. Therefore, the resultant graphene material easily meets the demand of various electrical or electronic devices, and has great industrial utility.

Therefore, the aspect of the present invention is that two steps of oxidation are employed to precisely control oxygen content of the oxidized graphene within a preferred range, and particularly, two oxidants with different strength of oxidation are used, such that the reduced graphene material after the reduction step has low resistivity within a preferred range.

Therefore, the aspect of the present invention is that two steps of oxidation are employed to precisely control oxygen content of the oxidized graphene within a preferred range, and particularly, two oxidants with different strength of oxidation are used, such that the reduced graphene material after the reduction step has low resistivity within a preferred range.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of manufacturing graphene material, comprising steps of:
   first oxidation by adding 10-40% (weight percent) sulfuric acid, sodium nitrate, and graphene to a reaction container in an ice bath, stirring for a period of a first stirring time, adding potassium manganate a first oxidant, and stirring for a period of a second stirring time, a weight ratio of graphene, sulfuric acid, and sodium nitrate being 1:1.5-0.5:1-6, a ratio of volume of sulfuric acid to weight of graphene being 15-60 ml:1 g;
   first heating by sealing the reaction container, heating up to a first heating temperature, and stirring for a period of a third stirring time;
   second heating by adding de-ionized water, sealing the reaction container, heating up to a second heating temperature, stirring for a period of a fourth stirring time, and forming a preliminary graphene oxide;
   second oxidation by adding de-ionized water to the preliminary graphene oxide, stirring for a period of a fifth stirring time, adding hydrogen peroxide solution as a second oxidant, and stirring for a period of a sixth stirring time, a ratio of volume of hydrogen peroxide solution to weight of graphene being 1-20 ml:1 g;
   separation by adding de-ionized water and hydrogen chloride solution, and removing a supernatant by a centrifugal machine to obtain a precipitant, the supernatant having pH within 7±1;
   drying by adding alcohol solution to the precipitant, and performing a heated-drying or freeze-drying process at a drying temperature from −20° C. to 80° C. for 4 hours-2 days to obtain a graphene oxide;
   first ultrasonic vibration by adding de-ionized water to the graphene oxide, and performing ultrasonic vibration through a ultrasonic vibration machine;
   reduction by adding a reductant, and gradually adding 25% (weight percent) ammonia solution to keep pH with 9-10, a weight ratio of the reductant to the graphene oxide being 0.5-5.0:0.5;
   second ultrasonic vibration by adding de-ionized water, and performing another ultrasonic vibration through the same ultrasonic vibration machine or another one ultrasonic vibration machine;
   heating by heating up to a third heating temperature, and stirring for a period of a seventh stirring time; and
   filtration by performing a suction-filtration process and a drying process to obtain a reduced graphene material,
   wherein a ratio of carbon to oxygen content in the graphene oxide is 1.14-2.81, and resistivity of the reduce graphene material is 1.45-150 Ω/cm.

2. The method as claimed in claim 1, wherein the first oxidation step is performed at a temperature not higher than 20° C., the first stirring time is 1-5 hours, and the second stirring time is 10 min to 3 hours.

3. The method as claimed in claim 1, wherein the first heating temperature is 30-40° C., and the third stirring time is 10 minutes-1 hour.

4. The method as claimed in claim 1, wherein a ratio of volume of the deionized water added in the step of second heating to weight of the graphene added in the step of first oxidation is 30-98 ml:1 g, the second heating temperature is 80-99° C., and the fourth stirring time is 10 minutes-1 hour.

5. The method as claimed in claim 1, wherein a ratio of volume of the deionized water added in the step of second oxidation to weight of the graphene added in the step of first oxidation is 65-350 ml:1 g, the fifth stirring time is 30 minutes-2 hour, and the sixth stirring time is 1-3 hours.

6. The method as claimed in claim 1, wherein a concentration of the alcohol solution is 10-70% (weight percent).

7. The method as claimed in claim 1, wherein the reductant is or ascorbic acid.

8. The method as claimed in claim 1, wherein a ratio of volume of the deionized water added in the step of first ultrasonic vibration to weight of the graphene oxide in the step of second oxidation is 500-1500 ml:0.5 g, the step of first ultrasonic vibration lasts for 30 minutes-2 hours, and the step of second ultrasonic vibration lasts for 10-40 minutes.

9. The method as claimed in claim 1, wherein the third heating temperature is 80-98° C., and the seventh stirring time is 1-3 hours.

* * * * *